United States Patent
Joyce et al.

(10) Patent No.: US 9,981,657 B2
(45) Date of Patent: May 29, 2018

(54) AUTONOMOUS VEHICLE PARKING AND TRANSITION TO MANUAL CONTROL

(71) Applicant: Ford Global Technologies, LLC, Dearborn, MI (US)

(72) Inventors: John P. Joyce, West Bloomfield, MI (US); Samer Abbas, Dearborn, MI (US); Scott J. Lauffer, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 46 days.

(21) Appl. No.: 15/098,440

(22) Filed: Apr. 14, 2016

(65) Prior Publication Data

US 2017/0297565 A1    Oct. 19, 2017

(51) Int. Cl.
| | | |
|---|---|---|
| *B60W 30/06* | (2006.01) | |
| *B60W 10/04* | (2006.01) | |
| *B60W 10/18* | (2012.01) | |
| *B60W 10/20* | (2006.01) | |
| *G05D 1/00* | (2006.01) | |

(52) U.S. Cl.
CPC ............ *B60W 30/06* (2013.01); *B60W 10/04* (2013.01); *B60W 10/18* (2013.01); *B60W 10/20* (2013.01); *G05D 1/0088* (2013.01)

(58) Field of Classification Search
CPC ...... B60W 30/06; B60W 10/04; B60W 10/18; B60W 10/20; G05D 1/0088
See application file for complete search history.

(56) References Cited

U.S. PATENT DOCUMENTS

| 8,823,530 B2 | 9/2014 | Green et al. |
|---|---|---|
| 9,063,543 B2 | 6/2015 | An et al. |

(Continued)

FOREIGN PATENT DOCUMENTS

| JP | 2011240816 A | 12/2011 |
|---|---|---|
| KR | 1020130019908 A | 2/2013 |

(Continued)

OTHER PUBLICATIONS

UKIPO Search Report for Application No. GB1705014.7 dated Aug. 31, 2017 (4 pages).

*Primary Examiner* — Michael D Lang
(74) *Attorney, Agent, or Firm* — Frank A. MacKenzie; Bejin Bieneman PLC (57) ABSTRACT

A system of computers configured to perform particular operations or actions by virtue of having software, firmware, hardware, or a combination of them on the system that in operation causes or cause the system to perform the actions. One general aspect includes a system, including a computer programmed to control each of an autonomous vehicle propulsion, steering, and braking, where the vehicle is subject to autonomous control. The system makes a first determination, based on data from a vehicle sensor, of availability of a vehicle parking area and makes a second determination, based on at least a geolocation of the vehicle, a system fault, a conditional boundary and availability of the parking area, to autonomously park in the parking area. Other embodiments of this aspect include corresponding computer systems, apparatus, and computer programs recorded on one or more computer storage devices, each configured to perform the actions of the methods.

19 Claims, 3 Drawing Sheets

(56) References Cited

U.S. PATENT DOCUMENTS

| | | |
|---|---|---|
| 2010/0271236 A1 | 10/2010 | Moshchuk et al. |
| 2015/0142244 A1 | 5/2015 | You et al. |
| 2015/0346727 A1 | 12/2015 | Ramanujam |
| 2016/0200317 A1* | 7/2016 | Danzl ................ B60K 28/06 701/25 |
| 2017/0123429 A1* | 5/2017 | Levinson ............ G05D 1/0088 |

FOREIGN PATENT DOCUMENTS

| | | |
|---|---|---|
| KR | 1020130128987 A | 11/2013 |
| KR | 101470190 B1 | 12/2014 |
| WO | 2008055567 A1 | 5/2008 |
| WO | WO 2015091637 A1 | 6/2015 |
| WO | WO 2015155133 A1 | 10/2015 |

* cited by examiner

AUTONOMOUS VEHICLE PARKING AND TRANSITION TO MANUAL CONTROL

BACKGROUND

Autonomous or semi-autonomous vehicles such as are now beginning to appear on roadways can, just like vehicles that are manually controlled by an operator, develop minor systems faults that can impede the vehicle's operation, e.g., problems with vehicle sensors or the like. A risk in an autonomous or semi-autonomous vehicle is that a minor systems fault can develop into a more serious fault, preventing operation of the vehicle, and leaving an occupant stranded in a dangerous situation, e.g., at a remote rural location where assistance is difficult to obtain, in the middle of a congested highway at rush hour, etc. Another risk in an autonomous vehicle is a possible inability to operate if environmental conditions change, e.g., when the autonomous vehicle approaches an area of bad weather, severe traffic, etc.

DETAILED DESCRIPTION

Figure 1:
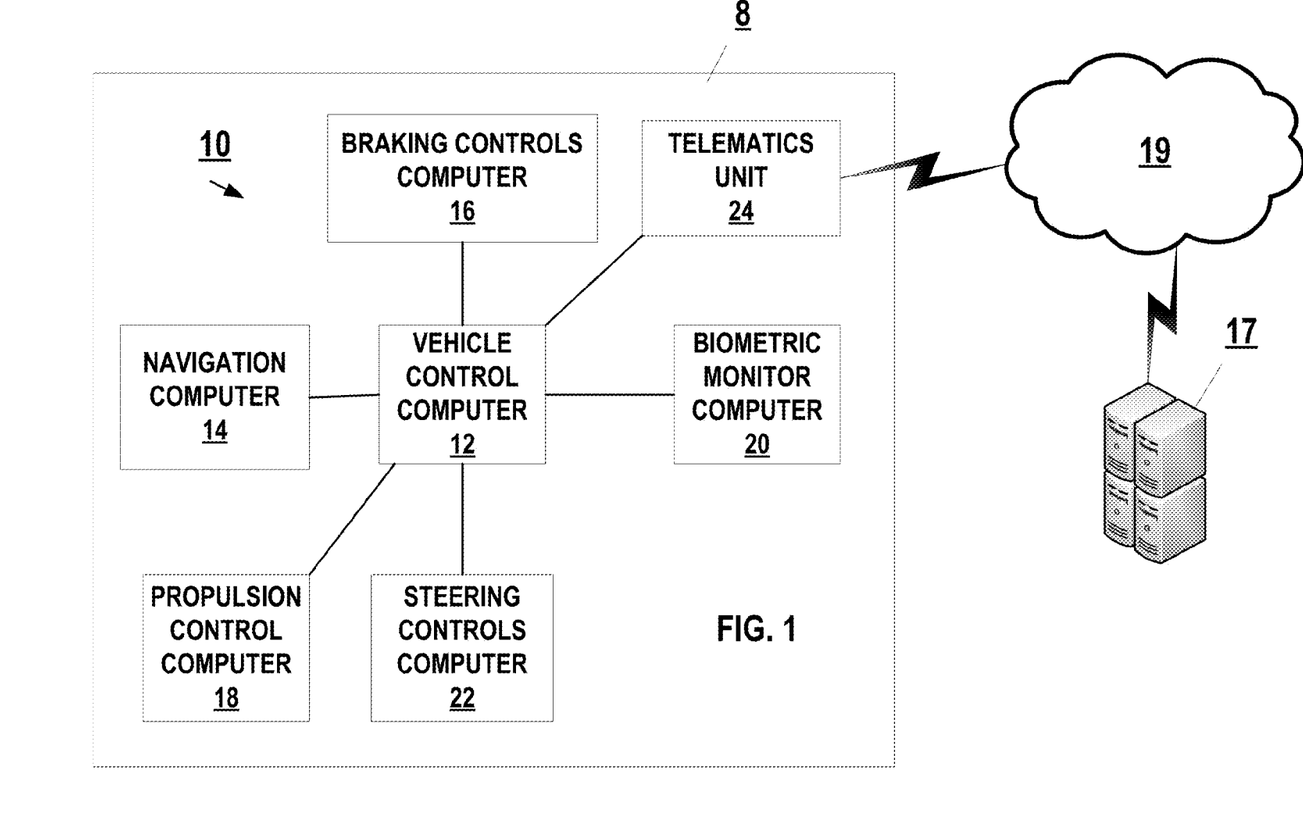
FIG. 1 is a block diagram of an exemplary autonomous vehicle system to control and monitor vehicle operation.

FIG. 1 is schematic diagram of an exemplary vehicle control system 10 of an autonomous vehicle (AV) 8 or semi-autonomous vehicle (not shown.) An autonomous vehicle 8 is one in which substantially all operations, i.e., all operations relating to propulsion, braking, and steering are under autonomous control by a control computer 12. A semi-autonomous vehicle is one in which at least one of such operations, e.g., one of propulsion, braking, and steering is controlled by the vehicle control system 10. When one or more system faults are detected in a vehicle 8 component and/or subsystem, as described below, the computer 12 may determine that the vehicle 8 is unable to perform one or more autonomous operations. Therefore, it may be warranted to steer the vehicle 8 to a safe and nearby vehicle parking area, e.g., a parking space, area of a road shoulder, etc. The computer 12 may therefore be programmed to allow autonomous operation of a vehicle 8 only when at least one such parking area is determined to be proximate, i.e., within a predetermined distance, e.g., 10 meters, 100 meters, etc., and accessible from a route of the vehicle 8. Such a parking area the vehicle 8 previously identified as a potential parking area.

As seen in FIG. 1, various vehicle 8 computers 14-22 can be communicatively connected to the control computer 12. These computers may each be an electronic control unit (ECU) or the like such as is known. The control computer 12 can include programming to monitor and control various ECUs and/or other vehicle 8 components.

The computer 12, as well as the other computers discussed below, have at least one processor and typically have a memory, e.g., comprising various types of permanent and transient memory such as are known to store computer instructions, register values, and temporary and permanent variables. Further, the control computer 12 can generally include instructions for exchanging data, e.g., from and to an occupant, for example via a wearable device, a portable user device such as s smartphone or the like, and/or Human Machine Interface (HMI) inside the vehicle 8, which may be one or more of an interactive voice response (IVR) system, a graphical user interface (GUI) including a touchscreen or the like, etc.

The vehicle 8 control computer 12 is typically connected to other computers 14-22 and/or other vehicle 8 ECUs, etc., via a vehicle network. For example, various communications may occur on a Controller Area Network (CAN) bus such as is known. Other wired and wireless communications can be included in a vehicle network, e.g., Ethernet, WiFi, etc. Further, the vehicle 8 can communicate with other networks or vehicles as described below, and may include wireless networking technologies, e.g., cellular, Wi-Fi®, Bluetooth®, Near Field Communication (NFC), wired and/or wireless packet networks, etc.

The control computer 12 is typically connected to a navigation computer 14, a braking controls computer 16, an propulsion control computer 18, a biometric monitor computer 20, a steering computer 22 and a telematics unit 24. The navigation computer 14 can receive, for example, a signal from the known Global Navigation Satellite System (GNSS) to determine the vehicle 8 location and/or the navigation computer 14 can deploy a dead reckoning system for vehicle 8 location determination.

The braking control computer 16 can monitor and control the vehicle 8 brakes, as well as any parameters affecting the stopping of the vehicle 8. The propulsion control computer 18 can monitor and control the engines and the motors along with the powertrain system of the vehicle 8. In the present context, a propulsion system could include a powertrain system including an internal combustion engine and/or electric motor, etc.

The biometric monitor computer 20 can observe the occupant, for example, to determine the occupant's level of alertness. In a first example, the biometric monitor computer 20 can observe the occupant's eyes to see if they open to determine if the occupant is asleep. In a second example, the biometric monitor computer 20 could, e.g., via an IVR system, engage verbally with the occupant to determine alertness. The steering computer 22 can monitor and control the steering system of the vehicle 8 as well as generate a steering profile which can be sent to the control computer 12 to use when navigating The telematics unit 24 can be in communication with a remote network 19, for example, the Internet via cellular, Wi-Fi®, Bluetooth®, Near Field Communication (NFC), wired and/or wireless packet networks, etc. The remote network 19 can provide a gateway to a server 17, which can provide a server download to the computer 12, for example, a collection of map data acquired from previous trips. The upload can include, for example, parking area locations and the sizes of a potential parking spots, which can be utilized in the event of a vehicle system fault or more serious vehicle emergency situation. In addition, the server 17 can provide updates on weather, traffic and updates, as well as updates geo-fencing boundary information that changes substantially continuously as a vehicle moves, e.g., navigates along a route.

The control computer 12 can monitor the other computer controllers 14-22 to obtain data to determine if the autonomous vehicle 8 is capable of autonomous operation. For example, the control computer 12 can query statuses of the other computers controller 14-22 statuses and produce a vehicle status report. The control computer can confirm the navigation computer 14 is on-line and can provide, or has provided, a route the autonomous vehicle 8 is to travel. The control computer 12 can receive a confirmation from the braking control computer 16, the propulsion control computer 18 and the steering computer 22 that their respective systems are operating nominally.

The biometric monitor computer 20 can send biometric data to occupant to the control computer 12, for example, the data can indicate that the occupant is asleep and that the control computer 12 cannot depend upon the occupant to take over control controls of the autonomous vehicle 8 in the event of a system fault that prevents safe autonomous operation. The biometric monitor computer 20 can also monitor the occupant's breathing and eye movements along with providing stimuli, for example, sounds to determine if the occupant is alert and oriented and can then take control of the vehicle 8, if necessary.

Parking Options

An "Occupant Path" as that term is used herein means a vehicle 8 path selected according to occupant-inputted criteria, i.e., a desired path of the occupant to his or her destination. The computer 12 is typically programmed to receive the autonomous vehicle 8, through its programming will attempt to accommodate such a route.

An "Autonomous Park Location" as that term is used herein means a parking location that can be reached from a current vehicle 8 location while the vehicle 8 is autonomously operated given operating limits of the computer 12 based on data available to the computer 12, and/or based on legal restrictions, e.g., a prohibited autonomous vehicle zone. An Autonomous Park Location is thus by definition within an operating range of the autonomous vehicle 8 (i.e., the vehicle 8 can reach the Autonomous Park Location from a present location) based on the vehicle's mechanical state and/or a system fault, available sensor data for navigation, legal restrictions, and possibly other factors.

Autonomous Park Locations can be identified and collected in a database of the autonomous vehicle when the autonomous vehicle 8 repeatedly travels the same routes, for example, the autonomous vehicle 8 sensors can identify potential autonomous park locations and save the set of coordinates in the computer 12 memory. Alternatively and in addition to the vehicle 8 collecting autonomous park locations from its sensors, a server can provide a download of potential parking locations for the vehicle 8, for example, when the vehicle 8 is an unfamiliar area that the vehicle 8 did not map.

A "Conditional Boundary" as that term used herein means a planned destination (e.g., input as described above to define the Occupant Path) if that destination is an Autonomous Park Location, otherwise it is a closest possible Autonomous Park Location to the Occupant Path. For example, a Control Limit Destination can be a closest location to the occupant's destination without violating applicable law or regulation, and is said to have a geo-fence around it. A geo-fence is a virtual fence surrounding an area, such as a country or a state that forbids autonomous operation of a vehicle. For example, an adjoining country or state may not permit autonomous vehicle 8 operations. In this scenario, the autonomous vehicle 8 could simply park the autonomous vehicle 8 at a parking facility near a border defining a change in legal restrictions or ask the occupant if he or she wishes to continue manually the drive into the adjoining country or a state.

A "Nearest Park Location" as that term is used herein means a nearest Autonomous Park Location. Often, the Nearest Park Location is an autonomous parking location facility that an occupant regards as less convenient than other Autonomous Park Locations that may be closer to the Occupant Path, to needed services, etc. However, depending on weather, a vehicle 8 mechanical state, or other factors affecting vehicle 8 operation, the Nearest Park Location can be the safest and the quickest alternative were an situation were to occur.

The "Transition Park Location" as that term is used herein means "nearest Autonomous Park Location that provides sufficient time for the operator to assume complete control of the vehicle 8 without deviating significantly from the path towards the Occupant Destination." Thus, a Transition Park Location is a parking area in which the occupant of the vehicle 8 can transition from passive occupant to driver/operator of the vehicle 8. For example, the occupant may be located in a rear seat of the vehicle 8, and may need to be able to safely exit and re-enter the vehicle 8 to transition to a driver's seat to operate the vehicle 8.

Vehicle Fault Severity Levels

RADAR, LIDAR and computer vision (CV) systems are optical sensor systems typically installed on AVs. Together with other sensors they are capable of providing kinematic information about a vehicle 8, e.g., position, velocity, acceleration and physical information about surroundings, e.g., obstacles, road signs, pedestrians, etc. The information from the sensors feeds into a sensor integrator subsystem which filters and integrates data from all vehicle 8 sensors. Detectable anomalies and erroneous data are typically filtered at this stage.

The sensor input data is sent to a state estimator which performs additional filtering and can estimate the current state of the vehicle 8. This state data is can be sent to the navigation computer 14 which acts as a high-level controller for the individual control algorithms related to degrees of freedom of the vehicle 8, e.g., velocity, heading, etc. The navigation computer 14 handles the high level control of the autonomous vehicle 8 navigation. In the event of an optical sensor failure, the data passed on to the state estimator will be either corrupt or missing, generating a biased position estimate for the navigation computer 14. The navigation computer 14 relies on this data to know where in the world the vehicle 8 is with respect to the waypoints, so a simple LIDAR failure could result in the navigation module thinking that the vehicle 8 is only 10 meters away from the target when in reality it is 100 meters away Incorrect operation of vehicle 8 may result in mishaps of various severity levels. Table I is an example of identified risks and a quantified number representing the measure of potential consequence of a hazard representing both the likelihood and the severity of something bad or undesired happening. During the hazard identification stage, hazards are classified according to their risks. A Preliminary Hazard Analysis (PHA) is the starting point to classify these hazards. As with most safety critical systems, the autonomous vehicle 8 system hazards can be classified in a qualitative manner, using pre-defined arbitrary categories known as risk classes computed as a product of severity and the likelihood of occurrence.

TABLE 1

Mishap Severity Levels

| Severity Level | Description |
| --- | --- |
| 1 | No loss of any kind |
| 2 | Minor property loss (low cost hardware parts) |
| 3 | Major property loss, damage to the environment |
| 4 | Loss of critical hardware, human injuries, major damage to the environment |
| 5 | Catastrophic loss of life, loss of the entire autonomous vehicle system, serious environment damage |

Table 2 is an exemplary list of hazards and faults for LIDAR, RADAR and CV subsystem, including an enumeration of the hazard's severity level. From a safety standpoint, hazards become the source for safety requirements. Typically, loss of any system functionality may lead to a hazard, e.g., the laser head of the LIDAR system stops rotating due to mechanical failure. The loss of functionality usually allows identifying the specific hazard. In turn, the hazard identification allows determining a control measure to be established to prevent or control this hazard, e.g., parking the vehicle 8 when a hazard is identified.

TABLE 2

Examples of severity levels

| Item | Sub-item | Fault Condition | Hazard | Severity Level |
|---|---|---|---|---|
| LIDAR | Position Encoder | Fails to read position data | Mirror Motor Malfunction | 4 |
| LIDAR | Electrical | Short circuit | Electrical Failure | 4 |
| LIDAR | Electrical | Overvoltage | Electrical Failure | 4 |
| LIDAR | Optical Receiver | Misalignment | Optical Receiver Error | 3 |
| LIDAR | Optical Filter | Damaged | Optical Receiver Error | 3 |
| LIDAR | Mirror Motor | Malfunction | LIDAR Failure | 4 |
| LIDAR | Mirror Motor | Malfunction | Laser Radiation | 4 |
| CV | Camera | Misalignment | CV Failure | 3 |
| CV | IR Filter | Missing | CV Failure | 3 |
| CV | Lens | Damaged | CV Failure | 3 |
| CV | Camera | Improper Lighting | CV Failure | 3 |
| Navigation Computer | N/A | LIDAR Failure | Navigational Failure | 4 |
| Navigation Computer | N/A | CV Failure | Navigational Failure | 4 |
| Navigation Computer | N/A | Navigational Failure | Property Damage | 5 |
| Navigation Computer | N/A | Navigational Failure | Vehicle Damage | 5 |
| Navigation Computer | N/A | Navigational Failure | Pedestrian Damage | 5 |

Process Flows

Figure 2:
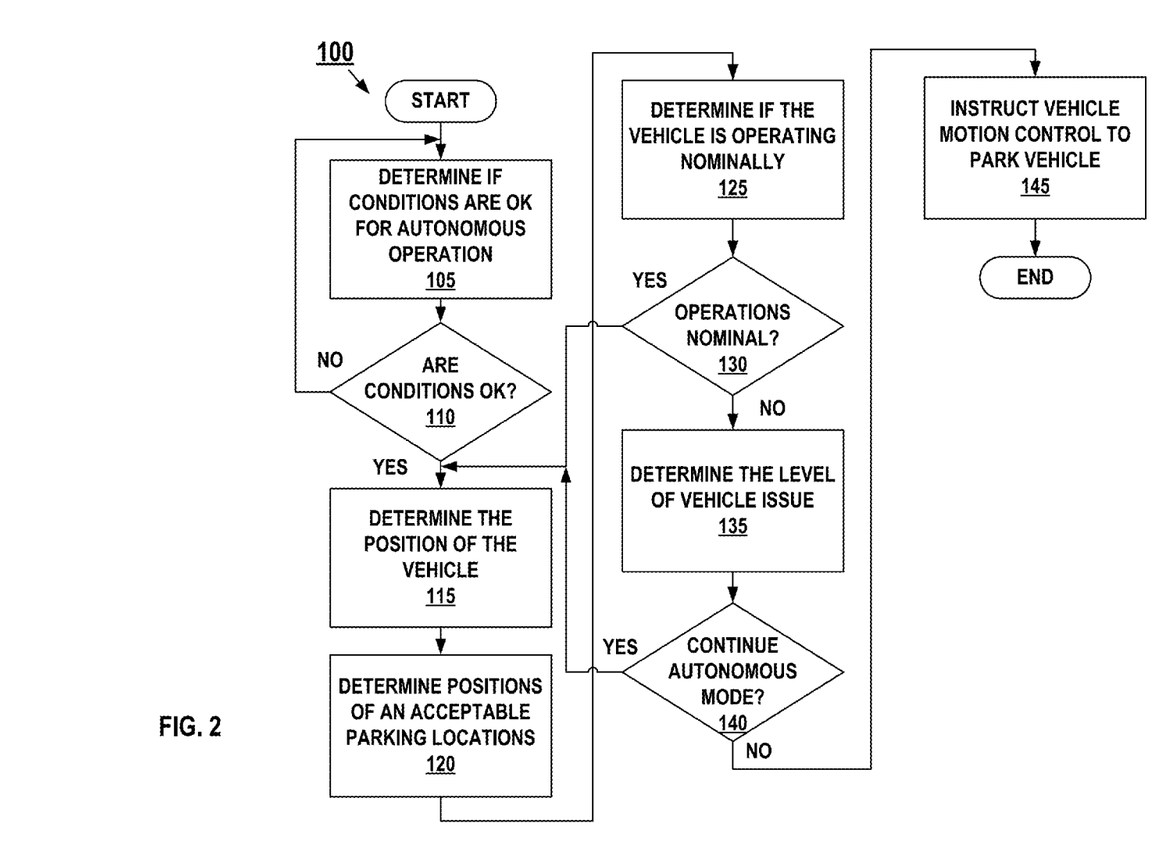
FIG. 2 is a flowchart of an exemplary process that may be implemented in the computer and associated hardware components of the system of FIG. 1.

FIG. 2 is a flow chart illustrating an exemplary process 100 that can be executed according to programming in a vehicle 8 computer 12 to determine if the vehicle 8 can be operated in an autonomous mode.

The process 100 begins in a block 105, which can also follow a block 110 as described below. The computer 12 evaluates whether conditions are acceptable for autonomous (including semi-autonomous) operation. For example, acceptable conditions can exist when faults are not reported from any of the vehicle 8 controller computers 14-22, and/or reported faults do not prevent autonomous vehicle 8 operation, that is the navigation computer 14, the braking controls computer 16, the propulsion control computer 18, the biometric monitor computer 20, the steering computer 22 and a telematics unit 24 all indicate that their respective systems of sensors and actuators are operating within non-fault parameters, i.e., within parameters acceptable for autonomous operation. For example, if one or more sensors to detect objects, e.g. an image sensor, a lidar sensor, a radar sensor, an ultrasonic sensors, etc., reported failure, then the computer 12 could determine that parameters were such that autonomous operation could not be carried out. To take another example, the computer 12 could determine that a navigation computer 14 was unable to determine a route and/or unable to determine the vehicle 8 geolocation, either of which could indicate that autonomous operation of the vehicle 8 could not be carried out. When the vehicle 8 is operating without detected faults, or at least without faults outside of parameters acceptable for autonomous operation, the vehicle 8 may be referred to herein as operating "nominally."

Next in the block 110, which can follow the block 105 or a block 130, if the evaluation of the block 105 is that conditions are acceptable for autonomous or semi-autonomous operation, then next a block 115 is executed, else the process 100 returns to the block 105 to await correction of a detected fault or, alternatively (and not as shown in FIG. 2) ends.

Next, in the block 115, the navigation computer 14 determines the geolocation of the vehicle 8, for example from signals from Global Navigation Satellite System (GNSS). A geolocation, as is known, can be expressed as coordinates, e.g., latitude and longitude coordinates.

Next, in a block 120, the computer 12, using the current vehicle geographical location, will locate at least one potential Autonomous Park Location and whether the parking position is available and can accommodate the vehicle 8. It is important that the parking space is proximate to, i.e., within a predetermined threshold distance of, the current geographical position or geographical positions along the Occupant Path. For example, an Autonomous Park Location may have been identified by the vehicle 8 when the vehicle 8 previously traversed the same route as part of the vehicle 8 ongoing mapping of potential parking positions. The Autonomous Park Location can be further identified as a set of geo-coordinates describing the parking space in a parking lot, for example, at a rest stop, an area on a road shoulder, a parking garage, etc. Additionally, a list of available potential Autonomous Park Locations can be sent to the computer 12 after it sends a request to a server 17 via a remote network 19. The server 17 can act as a database for parking locations, for example, when other vehicles traversing the same routes collect the parking location information, the other vehicles can upload this information to the server 17 via the remote network 19.

Further, the predetermined distance that defines whether a potential Autonomous Park Location is proximate to the vehicle 8 can be adjusted by the computer 12. For example, the predetermined distance could default to a distance deemed to be safe for a vehicle 8 to traverse to come to a stop and park in the event of a disabling fault, e.g., 10 meters, 100 meters, etc. However, the distance could be changed based on conditions, e.g., cut by a factor of, e.g., ½ (e.g., 100 meters becomes 50 meters) in the absence of daylight, in the presence of precipitation, in the presence of traffic above a predetermined density (i.e., a number of vehicle passing a point in a road in a period of time), the seriousness of a systems fault, etc.

Next, in a block 125, another check is made to determine whether vehicle 8 operations are nominal. For example, the computer 12 may determine there is a system fault with the vehicle 8 which would warrant diverting the vehicle 8 from its current route and park the vehicle 8 in a parking area, for example, at the Nearest Park Location. Examples of deviation from nominal operation can be found in Table 2. For example, the Navigation Computer 14 may stop working, which is considered a major navigational failure which could result in property damage. This type of major fault can be considered a "5" on the severity scale of 1 to 5, which would result in parking the vehicle 8 as quickly as possible so the fault can be addressed and corrected.

In a second example, the computer 12 may detect that the vehicle 8 is approaching a known problem area, for example, the computer 12 may detect that the vehicle 8 is approaching an area in which applicable law or regulation forbids autonomous vehicle 8 operation and the area has a virtual geo-fence around the area to restrict the vehicle 8 from the area. The computer 12 can route then route the autonomous vehicle 8 to the Control Limit Destination and park the autonomous vehicle 8.

In a third example, the vehicle 8 may be entering an unknown area or an unexplored area. An unknown area is an area where the vehicle 8 may have traveled previously, but most likely the computer 12 data regarding parking areas is outdated. An unexplored area is an area where the vehicle 8 has not traveled before, so there is no parking area data available. In either case, the computer 12 will either have to park the vehicle 8 at the boundary area. Alternatively, the vehicle 8 can request parking information from the server 17 for the unexplored area, and using the downloaded parking data continue on its journey. Additionally, while traveling through the unexplored area, the vehicle 8 can augment its parking data by collecting its own parking information and storing in memory of the computer 12 and possibly uploading the data to the server 17 at a later time.

Next, in the block 130, the computer 12 determines if the vehicle 8 operations or external factors are nominal, for example, the vehicle 8 is operating without detected faults, or at least without faults outside of parameters acceptable for autonomous operation. If vehicle 8 operations are nominal, the process 100 returns to the block 115, else the process 100 continues to a block 135.

In a block 135, the computer 12 analyzes the system fault to determine a severity threshold or level as described above in which the vehicle 8 must park itself or relinquish control to the occupant. The computer 12 can determine that one or more vehicle 8 systems are operating outside of acceptable parameters, for example, the steering computer 22 may indicate a system fault with a steering motor that is overheating, in which case the autonomous vehicle 8 should be parked as quickly as possible to avoid damage to the motor and loss of control of the vehicle 8. Alternatively, the vehicle 8 may be approaching an area in which operation in which autonomous mode is forbidden or the vehicle 8 may be approaching a weather zone or a traffic zone in which operation can be hazardous or difficult to traverse. The computer 12, based upon the severity of the system fault or condition, can then determine if further autonomous operation is acceptable or if the vehicle 8 operations should be relinquished to the operator.

Next, in a block 140 the computer 12, based upon the severity threshold, the process 100 will continue with or cease autonomous vehicle 8 operation. Next in the block 115 will be executed if autonomous operations is to continue, else next in a block 145 will be executed if autonomous operations is to cease.

In the block 145, the computer 12, depending on the severity of the fault can instruct the vehicle 8 to park at the Nearest Park Location or continue to the Autonomous Park Location, and the process 100 ends.

Figure 3:
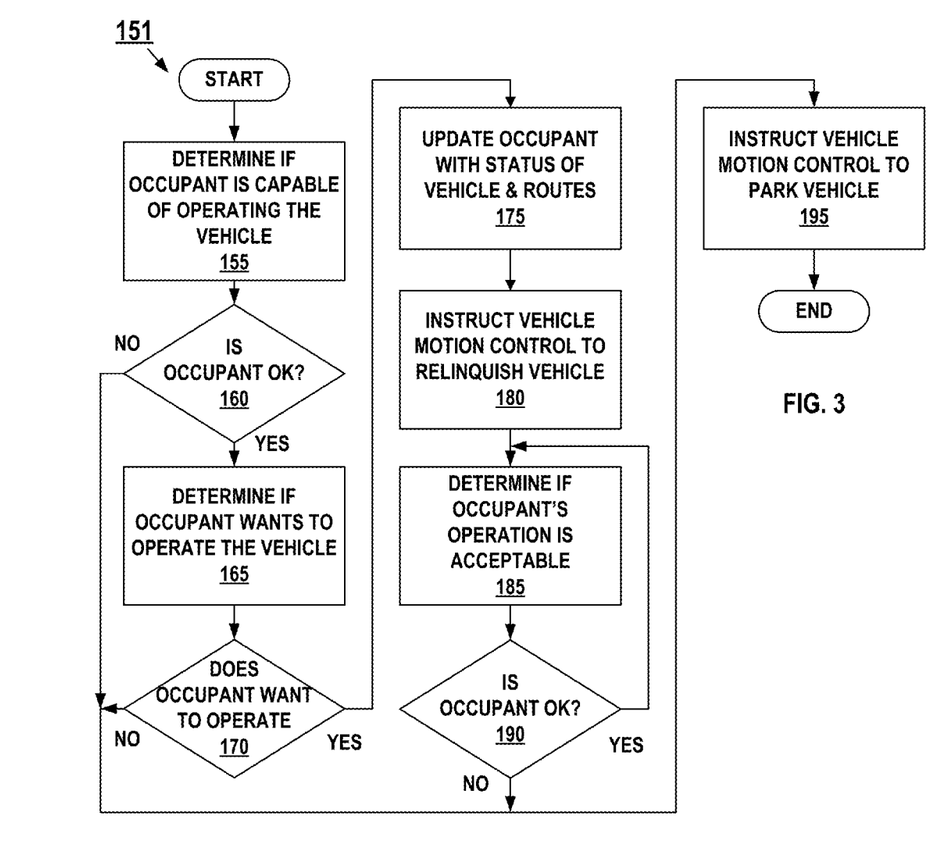
FIG. 3 is a flowchart of an exemplary sub-process of the process of FIG. 2.

FIG. 3 is a flow chart illustrating an exemplary process 151 that can be executed according to programming in the computer 12 to determine an occupant status and whether the occupant is able and willing to take control of the autonomous vehicle 8 in the event of a failure of nominal vehicle 8 operation.

The process 151 begins in a block 155, in which the computer 12 receives data from the biometric monitor computer 20 concerning the condition of the vehicle 8 occupant. The biometric data can include, for example, whether the occupant's eyes are closed and whether the occupant is sleeping. Various techniques are known and may be used for determining whether an occupant is drowsy, asleep, incapacitated due to drugs or alcohol, etc.

Next in a block 160, a determination is made by the computer 12 concerning the occupant's condition, for example, the data from the biometric computer 20 can indicate that the occupant is alert and orientated and is able, if need be, to take over vehicle 8 controls and next in a block 165 is then executed. If the computer 12 determines the occupant is not alert and orientated, next in a block 195 is then executed.

Next, in the block 165, the computer 12 queries the occupant to see if the occupant wants the vehicle 8 to transfer control or transition control of the autonomous vehicle 8 to the occupant. The query, for example, can be sent to a wearable device on the occupant or to a human machine interface (HMI) in the vehicle 8. Alternatively, the occupant can initiate a request to the vehicle control computer 12 requesting the control of the vehicle 8. The request, for example, can be sent from a wearable device on the occupant or from the HMI in the vehicle 8.

Next, in the block 170, the computer 12 makes a determination regarding the occupant's desire to operate the vehicle 8 based upon the occupant's response to the query from in the block 165 or the occupant's request to take control of the vehicle 8. If the occupant wants to take over the operation of the autonomous vehicle 8, next a block 175 is executed, else in the block 195 is executed.

Next, in the block 175, the computer 12 updates the occupant with a vehicle 8 status, for example, where the vehicle 8 is located, a vehicle 8 status, for example, the issue detected with the vehicle 8, the current route, the location of potential parking areas, etc.

Next in a block 180, the computer 12 can releases some or all control of the vehicle 8 to the occupant.

In the block 185, which can follow in the block 180 or in a block 190, the computer 12 determines if the occupant's operation of the vehicle 8 is acceptable. In one scenario, the computer 12 continues to control the vehicle 8 while monitoring the occupant's propulsion, steering, and braking input to the corresponding controls. The computer 12 can compare an input of propulsion, steering, and braking as provided by the occupant to what the computer 12 has determined as appropriate for the propulsion, steering, and braking controls for the current road conditions, weather conditions, traffic conditions, etc. The computer 12 can then methodically release control of the vehicle 8 to the occupant, for example, first giving the occupant steering control, then propulsion control some time later and finally braking control once the occupant has established that the occupant can safely control the vehicle 8.

Furthermore, once the occupant has control of the vehicle 8, the computer 12 can persistently monitor the occupant's operation and determine if the computer 12 should retake control of the vehicle. This could occur, for example, when the occupant gets drowsy and crosses over a center line in the roadway.

Next in the block 190, the computer 12 determines if the occupant of the vehicle 8, who is currently driving if "all right." The computer 12 can use biometric data, e.g., the occupant is closing their eyes or the computer 12 can make the determination from the manner the occupant is operating the vehicle 8, as discussed above in the block 185. If the compute 12 determines the occupant is "all right," the process returns to in the block 185, else the process continues to in the block 195.

In the block 195, which can be entered into from any of the blocks 160, 170 or 190 the computer 12 continues or returns to autonomous mode of operation and instructs the vehicle 8 to either park at the Nearest Park Location or continue to the Autonomous Park Location, and the process 151 ends.

Conclusion

As used herein, the adverb "substantially" modifying an adjective means that a shape, structure, measurement, value, calculation, etc. may deviate from an exact described geometry, distance, measurement, value, calculation, etc., because of imperfections in the materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Python, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer having a processor and a memory, the memory storing instructions executable by the processor such that the computer is programmed to:
    control each of an autonomous vehicle propulsion, steering, and braking, whereby the vehicle is subject to autonomous control;
    make a first determination, based on data from a vehicle sensor, of availability of a vehicle parking area; and
    after making the first determination of the availability of the parking area, then make a second determination that vehicle operation is not nominal;
    actuate the vehicle, based on the first determination and the second determination, to autonomously park the vehicle in the parking area;
    receive a request from an occupant to control of the autonomous vehicle;
    transfer control of the autonomous vehicle to the occupant;
    collect biometric data of the occupant;
    compare the biometric data with a known set of occupant biometric data;
    compare the autonomous vehicle propulsion, steering, and braking with an input of propulsion, steering, and braking from the occupant; and
    based on the of the comparison of the biometric data with the known set of occupant biometric data, and the comparison of the autonomous vehicle propulsion, steering, and braking with the input of propulsion, steering, and braking from the occupant, transition control of the autonomous control of the vehicle to the occupant.

2. The system of claim 1, wherein the sensor is at least an image sensor, a radar sensor, a lidar sensor and an ultrasonic sensor.

3. The system of claim 1, wherein the computer is further programmed to make a determination of the vehicle parking area based upon a collection of map data.

4. The system of claim 1, wherein the computer is further programmed to:
    determine if the vehicle is approaching a known problem area; and
    based on the determination, park the vehicle autonomously and end the autonomous control of the vehicle.

5. The system of claim 4, wherein the known problem area is one or more of the following: a prohibited autonomous vehicle zone, an unknown area, an unexplored area, a weather zone or a traffic zone.

6. The system of claim 1, wherein the computer is further programmed to provide at least a vehicle status and a geographical position of an autonomous vehicle and the parking area to the occupant.

7. A method, comprising:
controlling each of an autonomous vehicle propulsion, steering, and braking, whereby the vehicle is subject to autonomous control;
making a first determination, based on data from a vehicle sensor, an availability of a vehicle parking area;
after making the first determination of the availability of the parking area, then making a second determination that vehicle operation is not nominal; and
parking the vehicle autonomously in the parking area based upon the first determination and the second determination;
receiving a request from an occupant to control of the autonomous vehicle; and
transferring control of the autonomous vehicle to the occupant;
collecting biometric data of the occupant;
comparing the biometric data with a known set of occupant biometric data;
comparing the autonomous vehicle propulsion, steering, and braking with an input of propulsion, steering, and braking from the occupant; and
based on the of the comparison of the biometric data with the known set of occupant biometric data, and the comparison of the autonomous vehicle propulsion, steering, and braking with the input of propulsion, steering, and braking from the occupant, transitioning control of the autonomous control of the vehicle to the occupant.

8. The method of claim 7, wherein the sensor is at least an image sensor, a radar sensor, a lidar sensor and an ultrasonic sensor.

9. The method of claim 7, further comprising determining of the vehicle parking area based upon a collection of map data or a server download of the collection of map data.

10. The method of claim 7, further comprising determining if the vehicle is approaching a known problem area and parking the vehicle autonomously.

11. The method of claim 10, wherein the known problem area is one or more of the following: a prohibited autonomous vehicle zone, an unknown area, an unexplored area, a weather zone or a traffic zone.

12. The method of claim 7, further comprising providing at least a vehicle status and a geographical position of an autonomous vehicle and the parking area.

13. An autonomous vehicle parking system, comprising:
means for controlling each of vehicle propulsion, steering, and braking, whereby the vehicle is subject autonomous control;
means for scanning an area proximate the vehicle with a sensor;
means for making a first determination, based on data from the sensor, an availability of a vehicle parking area; and
means for, after making the first determination of the availability of the parking area, then making a second determination that vehicle operation is not nominal;
means for actuating the vehicle, based on the first determination and the second determination, to autonomously park the vehicle in the parking area;
means for receiving a request from an occupant to control of the autonomous vehicle; and
means for transferring control of the autonomous vehicle to the occupant;
means for collecting biometric data of the occupant;
means for comparing the biometric data with a known set of occupant biometric data;
means for comparing the autonomous vehicle propulsion, steering, and braking with an input of propulsion, steering, and braking from the occupant; and
means for, based on the of the comparison of the biometric data with the known set of occupant biometric data, and the comparison of the autonomous vehicle propulsion, steering, and braking with the input of propulsion, steering, and braking from the occupant, transitioning control of the autonomous control of the vehicle to the occupant.

14. The system of claim 13, further comprising means for downloading the vehicle parking areas from a network server via a telematics unit.

15. The system of claim 13, further comprising means for determining if the vehicle is approaching a known problem area; and
means for parking the vehicle autonomously.

16. The system of claim 15, wherein the known problem area is one or more of the following: a prohibited autonomous vehicle zone, an unknown area, an unexplored area, a weather zone or a traffic zone.

17. The system of claim 13, wherein the sensor is at least an image sensor, a radar sensor, a lidar sensor and an ultrasonic sensor.

18. The system of claim 13, further comprising means for determining the vehicle parking area based upon a collection of map data or a server download of the collection of map data.

19. The system of claim 13, further comprising means for providing at least a vehicle status and a geographical position of an autonomous vehicle and the parking area.

* * * * *

UNITED STATES PATENT AND TRADEMARK OFFICE
CERTIFICATE OF CORRECTION

PATENT NO. : 9,981,657 B2
APPLICATION NO. : 15/098440
DATED : May 29, 2018
INVENTOR(S) : John P. Joyce et al.

It is certified that error appears in the above-identified patent and that said Letters Patent is hereby corrected as shown below:

In the Claims

Column 11, in Line 34, replace "of the vehicle parking area" with -- "the vehicle parking area" --.

Signed and Sealed this
Seventh Day of August, 2018

Andrei Iancu
*Director of the United States Patent and Trademark Office*